(12) United States Patent
Matthews et al.

(10) Patent No.: US 11,599,323 B2
(45) Date of Patent: Mar. 7, 2023

(54) TOUCHSCREEN BOOM POD

(71) Applicant: Rockwell Collins, Inc., Cedar Rapids, IA (US)

(72) Inventors: Cheyenne Matthews, Marion, IA (US); Caleb Owenby, Greenback, TN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 233 days.

(21) Appl. No.: 17/034,372

(22) Filed: Sep. 28, 2020

(65) Prior Publication Data

US 2022/0100454 A1    Mar. 31, 2022

(51) Int. Cl.
| | | |
|---|---|---|
| *G06F 3/14* | (2006.01) | |
| *G06T 7/70* | (2017.01) | |
| *B64D 39/02* | (2006.01) | |
| *B64D 47/08* | (2006.01) | |
| *G06F 3/041* | (2006.01) | |
| *G06F 3/04845* | (2022.01) | |
| *G06T 3/60* | (2006.01) | |
| *G06T 11/00* | (2006.01) | |

(52) U.S. Cl.
CPC ........... *G06F 3/1423* (2013.01); *B64D 39/02* (2013.01); *B64D 47/08* (2013.01); *G06F 3/041* (2013.01); *G06F 3/04845* (2013.01); *G06T 3/60* (2013.01); *G06T 7/70* (2017.01); *G06T 11/00* (2013.01); *G06T 2207/10016* (2013.01); *G06T 2207/20081* (2013.01); *G06T 2207/20084* (2013.01)

(58) Field of Classification Search
CPC .... G06F 3/1423; G06F 3/041; G06F 3/04845; B64D 39/02; B64D 47/08; B64D 39/00; G06T 3/60; G06T 7/70; G06T 11/00; G06T 2207/10016; G06T 2207/20081; G06T 2207/20084
See application file for complete search history.

(56) References Cited

U.S. PATENT DOCUMENTS

| | | | |
|---|---|---|---|
| 4,025,193 A | 5/1977 | Pond et al. | |
| 4,298,176 A | 11/1981 | Kendall | |
| (Continued) | | | |

FOREIGN PATENT DOCUMENTS

| | | |
|---|---|---|
| CN | 106428583 A | 2/2017 |
| EP | 2300321 A2 | 3/2011 |
| (Continued) | | |

OTHER PUBLICATIONS

Rockwell Collins, Inc., Refueling Vision System, https://www.rockwellcollins.com/-/media/Files/Unsecure/Products/Product_Brochures/Displays/Head_up_displays/Tactical_3D_Airborne_Vision_System_Data_Sheet.ashx, Downloaded Jul. 27, 2020, 2 pages.

(Continued)

*Primary Examiner* — David D Davis
(74) *Attorney, Agent, or Firm* — Suiter Swantz pc llo (57) ABSTRACT

A boom pod with an adaptable user interface automatically reconfigures based on operation phase. Elements of the user interface may also be manually reconfigured based on operator preference. Operator reconfigurations may be recorded for use during similar phases in subsequent operations. A controller automatically records system status during a refueling operation and prepares a digital log entry. Portions of the use interface are dedicated to augmented displays to assist the operator at any given operational phase.

14 Claims, 7 Drawing Sheets

(56) References Cited

U.S. PATENT DOCUMENTS

| | | | |
|---|---|---|---|
| 5,499,784 A | 3/1996 | Crabere et al. | |
| 5,530,650 A | 6/1996 | Biferno et al. | |
| 5,904,729 A | 5/1999 | Ruzicka | |
| 6,512,527 B1 | 1/2003 | Barber et al. | |
| D485,279 S | 1/2004 | DeCombe | |
| D549,722 S | 8/2007 | Ito et al. | |
| 7,298,291 B2 | 11/2007 | Thal et al. | |
| 7,309,048 B2 * | 12/2007 | von Thal | B64D 39/00 |
| | | | 340/953 |
| D589,526 S | 3/2009 | Taylor et al. | |
| D614,192 S | 4/2010 | Takano et al. | |
| 7,980,512 B1 * | 7/2011 | Speer | C07D 271/113 |
| | | | 244/135 A |
| 8,370,002 B2 | 2/2013 | Stecko et al. | |
| D695,303 S | 12/2013 | Stovicek et al. | |
| D714,339 S | 9/2014 | Hendrickson et al. | |
| 9,150,310 B1 * | 10/2015 | Bray | B64D 39/00 |
| 9,248,916 B2 | 2/2016 | Ruiz | |
| D753,684 S | 4/2016 | Rahn et al. | |
| D754,680 S | 4/2016 | Lee et al. | |
| 9,334,062 B2 | 5/2016 | Degiorgis et al. | |
| D760,237 S | 6/2016 | Sabadosh et al. | |
| D764,516 S | 8/2016 | Lamparelli | |
| D778,935 S | 2/2017 | Scheepers et al. | |
| D784,391 S | 4/2017 | Yuguchi et al. | |
| D785,016 S | 4/2017 | Berwick et al. | |
| D790,558 S | 6/2017 | Omiya | |
| D790,572 S | 6/2017 | Subramanian et al. | |
| D800,739 S | 10/2017 | Sukumaran et al. | |
| D817,974 S | 5/2018 | Akatsu et al. | |
| D823,312 S | 7/2018 | Imamura et al. | |
| D826,977 S | 8/2018 | Nakajima et al. | |
| D828,845 S | 9/2018 | Harder et al. | |
| D876,448 S | 2/2020 | Li et al. | |
| D880,513 S | 4/2020 | Wang et al. | |
| D918,253 S | 5/2021 | Choe et al. | |
| D942,479 S | 2/2022 | Zimmerman et al. | |
| D946,024 S | 3/2022 | Vogler-Ivashchanka et al. | |
| 11,262,900 B1 | 3/2022 | Burkhead et al. | |
| D951,980 S | 5/2022 | Befort et al. | |
| D957,443 S | 7/2022 | Drole et al. | |
| 2005/0219225 A1 * | 10/2005 | Dunn | G09B 5/02 |
| | | | 434/416 |
| 2011/0147528 A1 | 6/2011 | Lozano | |
| 2011/0180666 A1 | 7/2011 | Speer et al. | |
| 2017/0083206 A1 | 3/2017 | He et al. | |
| 2018/0075762 A1 | 3/2018 | Gadgil et al. | |
| 2018/0210636 A1 | 7/2018 | R et al. | |
| 2019/0220152 A1 | 7/2019 | Ramachandra et al. | |
| 2019/0272660 A1 | 9/2019 | Black et al. | |
| 2021/0020055 A1 | 1/2021 | Bazawada et al. | |
| 2021/0065558 A1 | 3/2021 | Melendez et al. | |
| 2021/0339851 A1 | 11/2021 | Fell, Jr. et al. | |
| 2021/0390870 A1 | 12/2021 | Subramaniyan et al. | |
| 2022/0101734 A1 | 3/2022 | Crouch et al. | |
| 2022/0122466 A1 | 4/2022 | Feyereisen et al. | |

FOREIGN PATENT DOCUMENTS

| | | |
|---|---|---|
| FR | 2572706 B1 | 1/1990 |
| WO | 2009082400 A1 | 7/2009 |

OTHER PUBLICATIONS

Rogoway, Tyler et al., "This Is What the Boom Operator's Station on the New KC-46 Tanker Actually Looks Like", Refueling Vision and Control System, USAF, https://www.thedrive.com/the-war-zone/27268/this-is-what-the-remote-boom-operators-station-on-a-kc-46-tanker-really-looks-like, Apr. 2, 2019, 22 pages.

Extended Search Report in European Application No. 21198913.2, dated Feb. 14, 2022, 10 pages.

* cited by examiner

TOUCHSCREEN BOOM POD

BACKGROUND

Boom pods used to control in-flight refueling operations currently include banks of gauges, knobs, and switches that individually control aspects of the refueling boom. Such boom pods offer insufficient flexibility and situational awareness to the operator. Furthermore, many of the physical knobs and switches are not needed during any given operational phase, but continue to clutter the control surface ad may contribute to user error.

SUMMARY

In one aspect, embodiments of the inventive concepts disclosed herein are directed to a boom pod with an adaptable user interface that automatically reconfigures based on operation phase. Elements of the user interface may also be manually reconfigured based on operator preference. Operator reconfigurations may be recorded for use during similar phases in subsequent operations.

In a further aspect, a controller automatically records system status during a refueling operation and prepares a digital log entry.

In a further aspect, portions of the use interface are dedicated to augmented displays to assist the operator at any given operational phase.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a boom pod with an adaptable user interface that automatically reconfigures based on operation phase. Elements of the user interface may also be manually reconfigured based on operator preference. Operator reconfigurations may be recorded for use during similar phases in subsequent operations. A controller automatically records system status during a refueling operation and prepares a digital log entry. Portions of the use interface are dedicated to augmented displays to assist the operator at any given operational phase.

Figure 1:
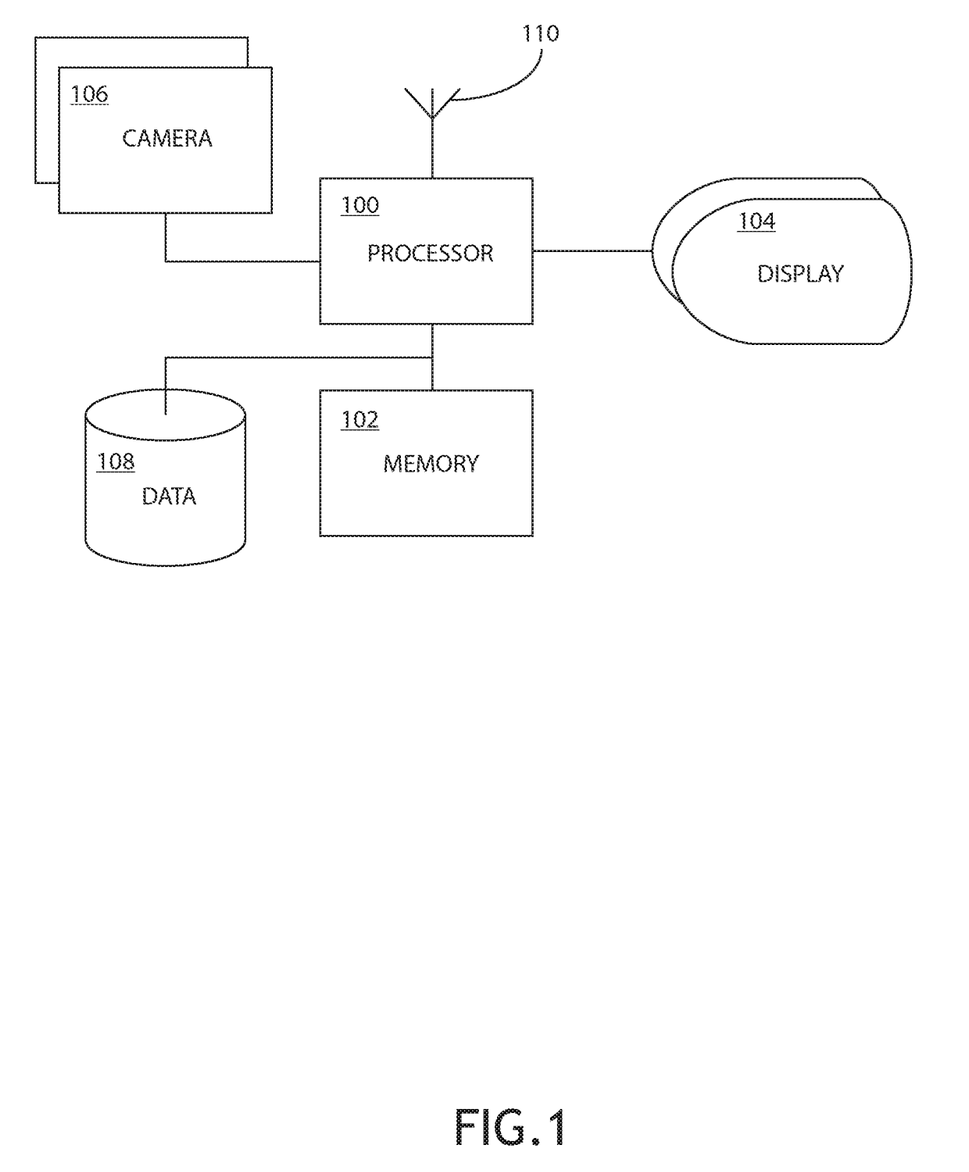
FIG. 1 shows a block diagram of a system according to an exemplary embodiment.

Referring to FIG. 1, a block diagram of a system according to an exemplary embodiment is shown. The system, embodied in an aircraft refueling boom pod, includes a processor 100, memory 102 in data communication with the processor 100 for embodying processor executable code, and one or more displays 104. The displays 104 may be touch sensitive to allow for input and interaction with the functionality of the processor 100. In at least one embodiment, one or more cameras 106 are in data communication with the processor 100 to provide a real-time image or data derived from a real-time image to the displays 104.

In at least one embodiment, a data storage element 108 in data commination with the processor 100 may store a record of refueling interactions in a log for later contemporaneous or subsequent transmission via a data communication element 110. Furthermore, the data storage element 108 may record changes to a user interface via operator interaction with the touch sensitive displays 104 to maintain a persistent, desired layout for each operator during each phase of a refueling operation.

In at least one embodiment, the processor 100 may apply one or more augmented reality overlays to images from the cameras 106. For example, a camera 106 at a relatively fixed location corresponding to a refueling boom arm may produce an image to assist in positioning the boom arm; the processor 100 may apply an augmented reality overlay to the image that corresponds to the maximum movement of the boom arm. In another example, the processor 100 may apply image processing algorithms such as edge detection to apply an augmented reality overlay of the aircraft being refueled to enhance the operator's view of the aircraft, possibly including low-light enhancement. In at least one embodiment, the processor 100 may determine an aircraft type based on a database of known aircraft from the data storage element 108, and apply an augmented reality overlay to enhance important features of the aircraft. In at least one embodiment, the processor 100 may utilize image processing algorithms or other onboard sensors to determine the location of the boom arm with respect to the images from the cameras 104; in such embodiments, the processor 100 may render an enhanced view of the boom arm and/or an indication of a calculated distance and direction between the boom arm and the corresponding refueling port on the aircraft.

Alternatively, an operator may desire certain of the augmented reality features, but not the underlying image. In at least one embodiment, the processor 100 may use an image from one or more of the cameras 104 to determine certain image overlays such as the boundaries of the boom arm and/or a current location of the boom, but render those overlays on a blank portion of the display without the image.

Figure 2:
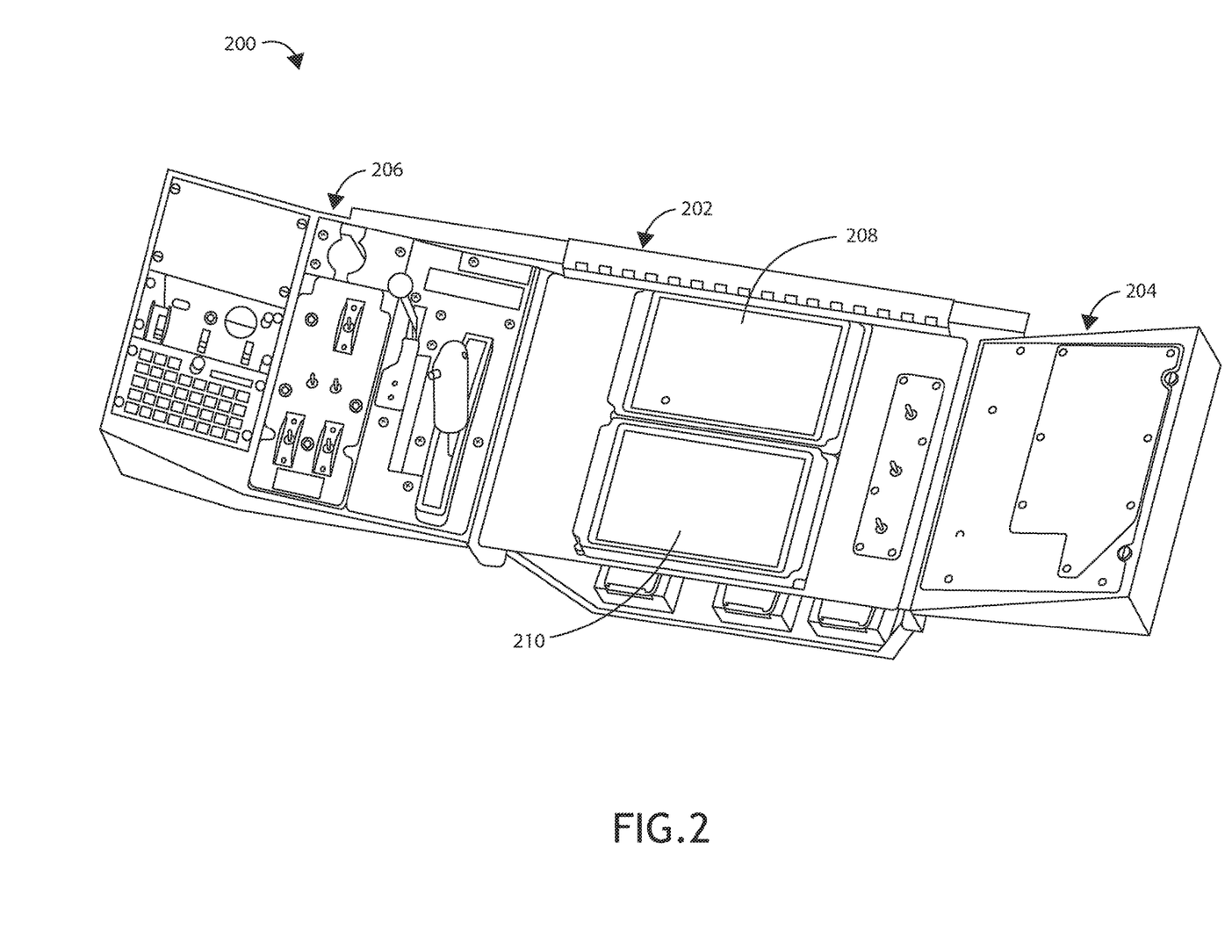
FIG. 2 shows a perspective view of a boom pod according to an exemplary embodiment.

Referring to FIG. 2, a perspective view of a boom pod 200 according to an exemplary embodiment is shown. The boom pod 200 may be divided into an informational panel 202 and a control panel 206; in at least one embodiment, the control panel 206 may be substantially similar to existing control panels 206. Previously, boom pods 200 may have included an ancillary control panel 204; but in at least one embodiment, the ancillary control panel 204 is not needed. When embodiments are retrofit into existing aircraft, existing controls may be obviated and removed.

The informational panel 202 comprises one or more displays 208, 210 in place of existing gauges, indicator lights, control knobs, and switches of existing boom pods 200. In at least one embodiment, the displays 208, 210 may be stacked vertically or arranged horizontally. One or more of the displays 208, 210 may include a touch sensitive screen for selecting inputs that generally correspond to the functionality of the existing switches and knobs. Alternatively, such inputs may correspond to sets of functions that previously required multiple switch and/or knob inputs. In at least one embodiment, one or more of the displays 208, 210, or some portion thereof, may include a relatively fixed layout while other displays 208, 210 or portions of displays 208, 210 may be reconfigurable via touch inputs. Furthermore, layouts may be operator specific or operational phase specific such that layouts may be automatically reconfigured to present inputs in an ergonomically efficient way at each operational phase.

Figure 3:
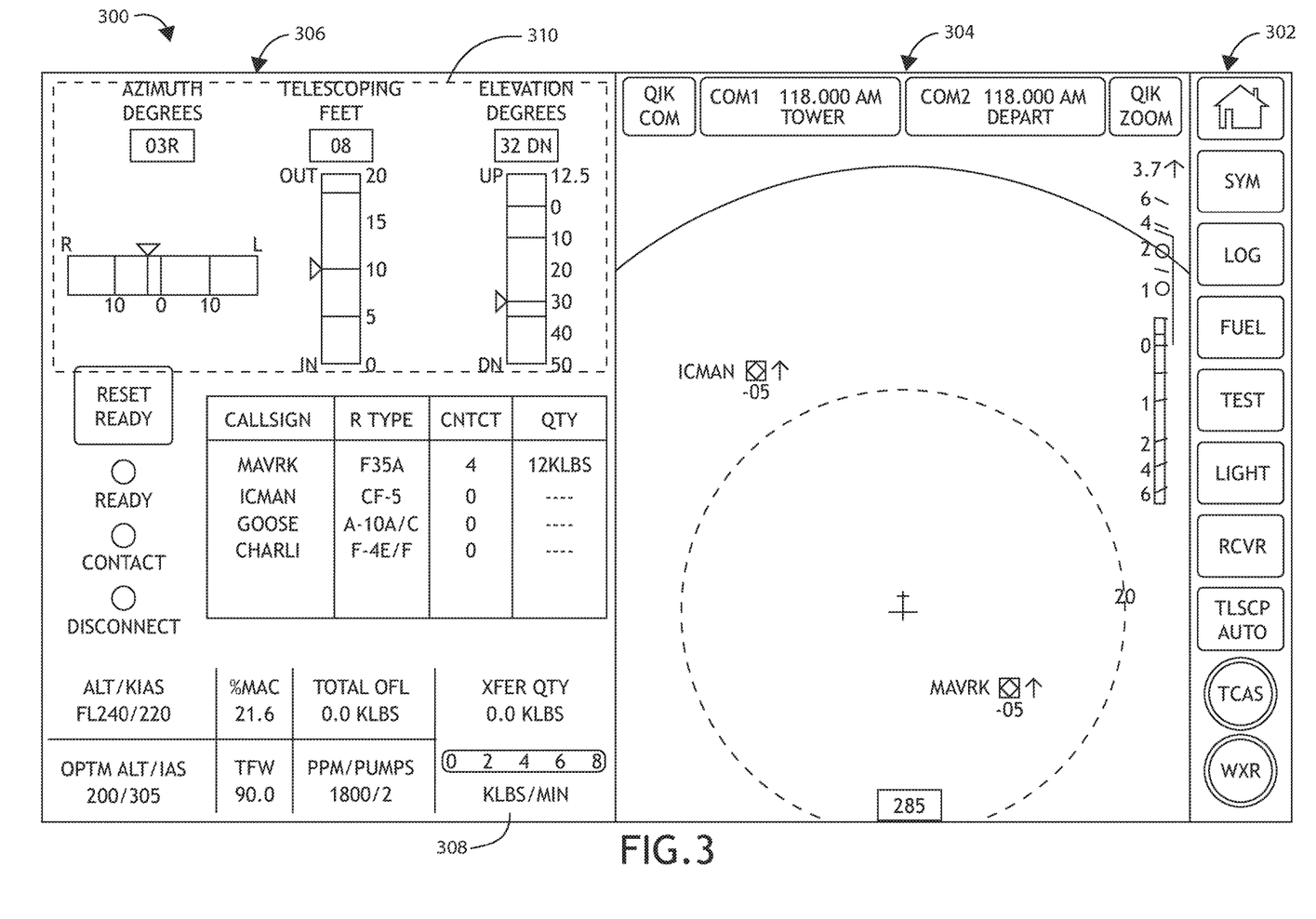
FIG. 3 shows a graphical user interface according to an exemplary embodiment.

Referring to FIG. 3, a graphical user interface 300 according to an exemplary embodiment is shown. The user interface 300 may be divided into a layout display control element 302 and one or more informational display elements 304, 306. In at least one embodiment, the layout display control element 302 may comprise a control group for selecting layouts to render in the one or more informational display elements 304, 306. Each layout may be associated with one of the informational display elements 304, 306 by default, and may be permanently or temporarily reconfigurable to another of the informational display elements 304, 306.

In at least one embodiment, one of the informational display elements 304, 306 may include comms controls. Furthermore, one of informational display elements 304, 306 may include a fuel widget or layout element 308 generally corresponding to fuel transfer metrics; likewise, a boom widget of layout element 310 may generally correspond to the disposition and orientation of the boom arm. Such fuel and boom layout elements 308, 310 may be generally associated with a singular layout element that may be selected by the operator; alternatively, or in addition, fuel and boom layout elements 308, 310 may be associated with an operational phase to automatically render during that operational phase and de-render outside of that operational phase to remove unneeded visual clutter and improve situational awareness. In at least one embodiment, data elements that may be displayed in one or more of the available layouts may be bounded by safe operational ranges; the processor rendering the user interface 300 may determine when an undisplayed data point is outside of a bounded range and provide a indicator to the operator such as illuminating a corresponding control in the layout display control element 302 or automatically rendering the corresponding layout.

In at least one embodiment, the layout display control element 302 and one or more informational display elements 304, 306 may be repositionable by an operator such as via tap-and-hold.

In at least one embodiment, data corresponding to data being displayed, and/or actual recorded representations may be recorded in a log. Alternatively, or in addition, data and representations of undisplayed data (data corresponding to layouts not being rendered) may be recorded in the log also.

In at least one embodiment, one or more of the layouts may include lighting controls. Alternatively, or in addition, lighting controls may be persistent in one or more of the informational display elements 304, 306 and/or the layout display control element 302. Lighting controls may be associated with an operation phase such that light levels are set to predetermined levels at each operational phase, potentially based on a time of day and/or mission requirements. Increment and decrement controls may allow light levels to be set at certain predefined levels. Lighting controls may include light positioning where available. In at least one embodiment, certain lights may be dedicated to giving the pilot of the fueling aircraft directional signals; those lights may be automated according to positioning algorithms, potentially utilizing one or more onboard cameras, with the option to allow an operator to give further instructions by manipulating a touch screen control that is translated to light indicators.

Figure 4:
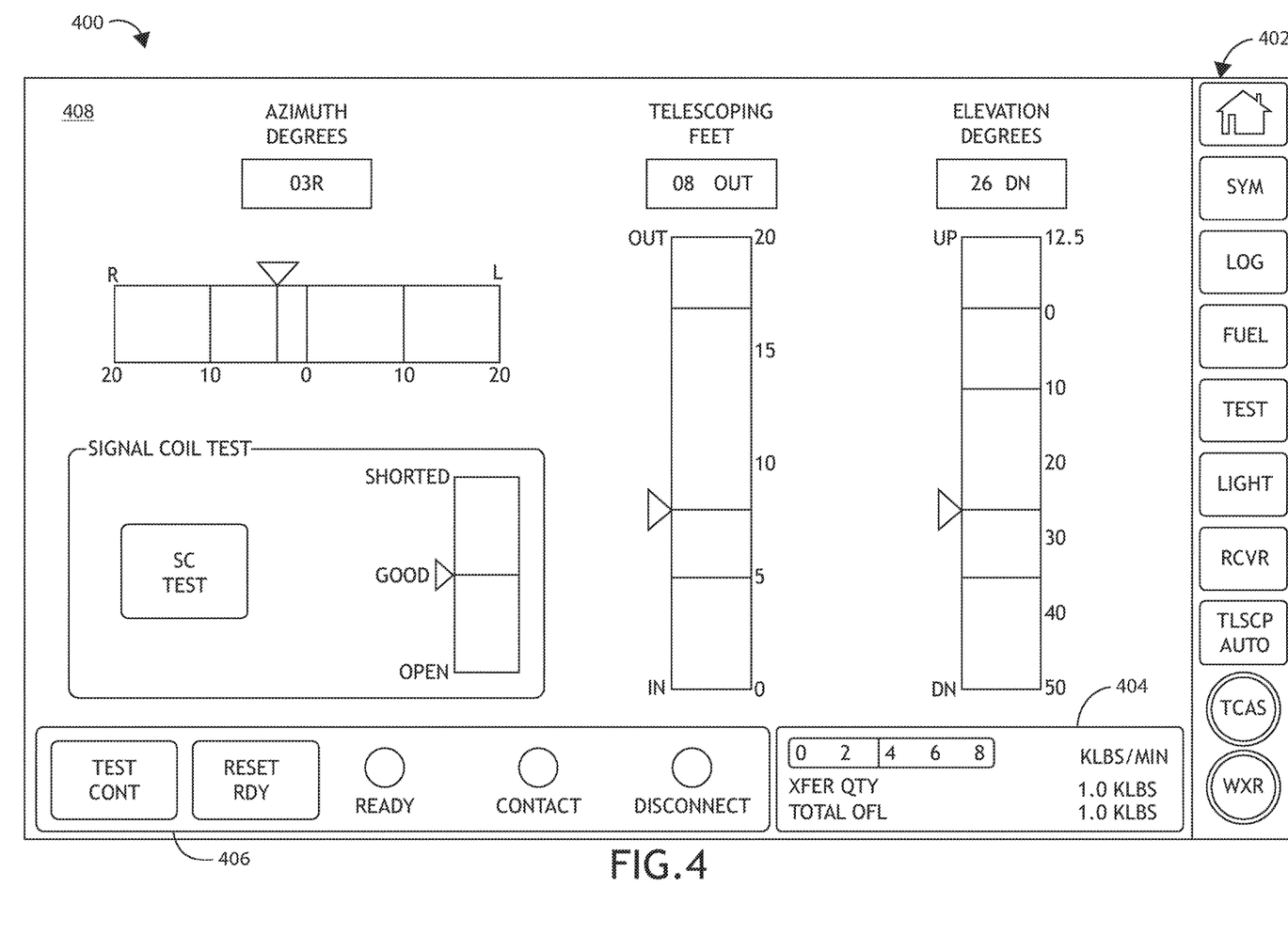
FIG. 4 shows a graphical user interface according to an exemplary embodiment.

Referring to FIG. 4, a graphical user interface 400 according to an exemplary embodiment is shown. In at least one embodiment, the user interface 400 may be rendered as a predefined layout including boom arm position data 408, boom arm controls 406 and indicators, and fuel transfer data 404. Such user interface 400 may be rendered in response to a specific refueling operation phase.

In at least one embodiment, a layout display control element 402 comprises a control group for selecting layouts to render in the user interface 400, including the boom arm position data 408. In at least one embodiment, layout display control element 402 may be repositioned by an operator; furthermore, individual data display and control elements 408, 406, 404 may be repositioned within the larger layout. Such repositioning may be recorded along with an operational phase and an operator identify such that in subsequent refueling operations, the repositioned elements 408, 406, 404 will be rendered in those new positions.

Figure 5:
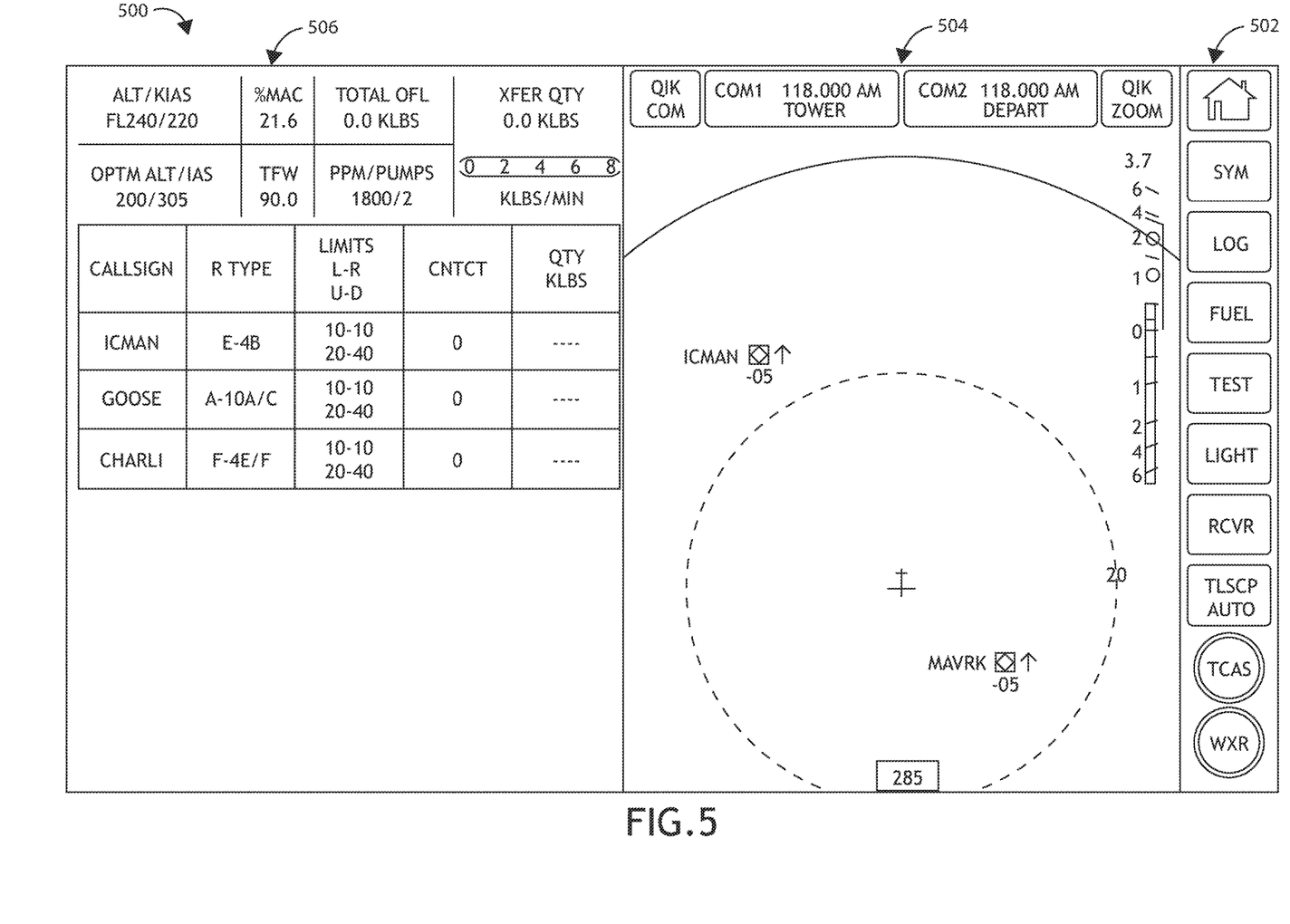
FIG. 5 shows a graphical user interface according to an exemplary embodiment.

Referring to FIG. 5, a graphical user interface according to an exemplary embodiment is shown. The user interface 500 may be divided into a layout display control element 502 and one or more informational display elements 504, 506. In at least one embodiment, the layout display control element 502 may comprise a control group for selecting layouts to render in the one or more informational display elements 504, 506. Each layout may be associated with one of the informational display elements 504, 506 by default, and may be permanently or temporarily reconfigurable to another of the informational display elements 504, 506.

In at least one embodiment, when different layouts are selected from the layout display control element 502, such new layouts may be rendered in a predetermined informational display element 504, 506; replacing whatever layouts were previously rendered there. Such replacement may enhance situational awareness my removing unneeded or undesired layouts. Furthermore, a processor may automatically determine which layouts to render based on the operation phase of the refueling operation. Where an operator selects other than the automatically determine layout, the processor may record the altered layout paradigm for subsequent operations.

Figure 6:
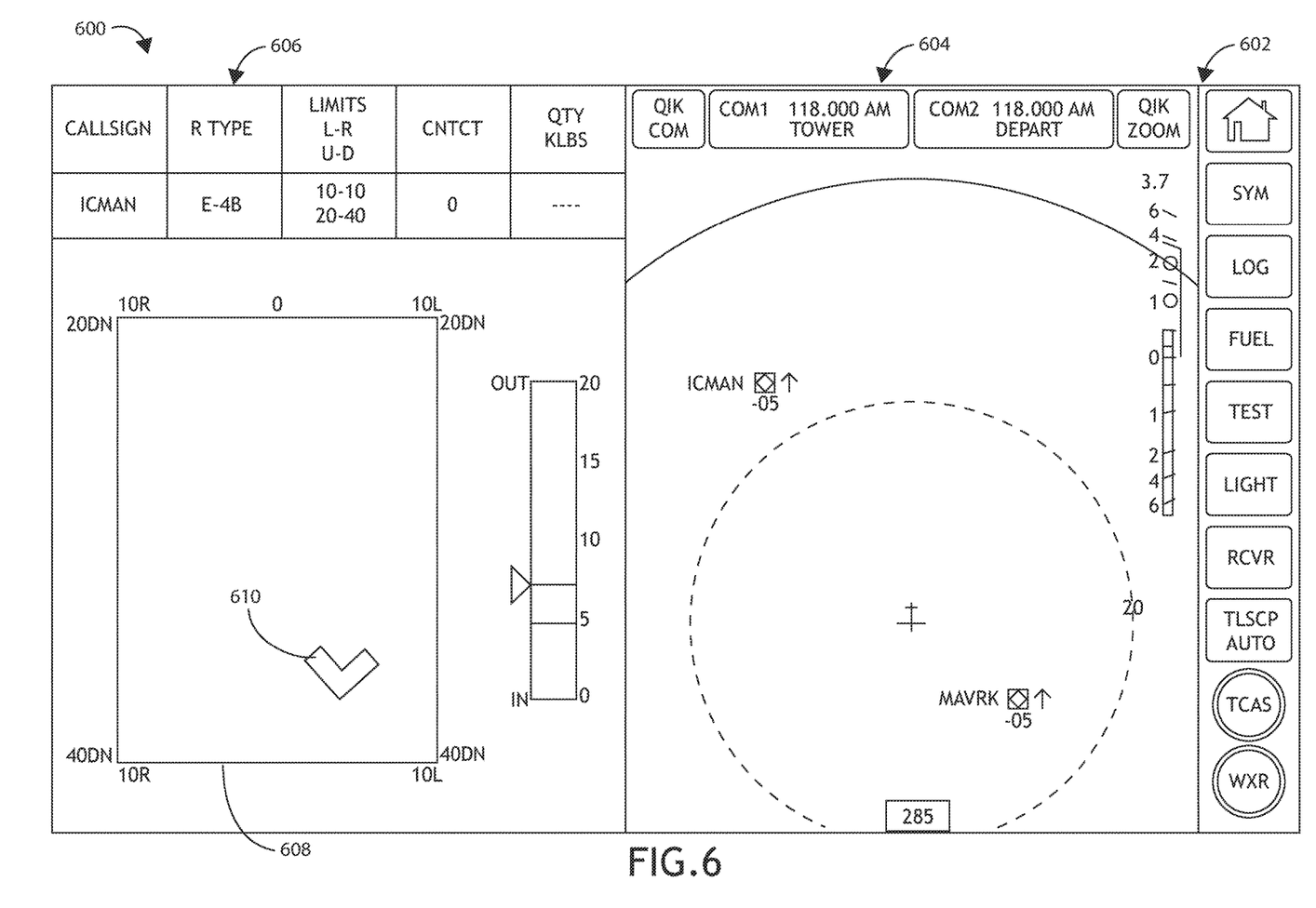
FIG. 6 shows a graphical user interface according to an exemplary embodiment.

Referring to FIG. 6, a graphical user interface according to an exemplary embodiment is shown. The user interface 600 may be divided into a layout display control element 602 and one or more informational display elements 604, 606. At least one of the informational display elements 604, 606 may render a boom arm position graphic derived from one or more image streams from cameras on the refueling aircraft. The graphic may comprise one or more boom arm boundary indicators 608 defined by the maximum movement range of the boom arm as would be visible in the image stream. Furthermore, a boom arm position indicator 610 may also be rendered.

In at least one embodiment, the one or more boom arm boundary indicators 608 and boom arm position indicator 610 may be rendered with ream-time positions in the informational display element 606 corresponding to where they would be displayed as an overlay to a streaming image, but the streaming image is not rendered.

Figure 7:
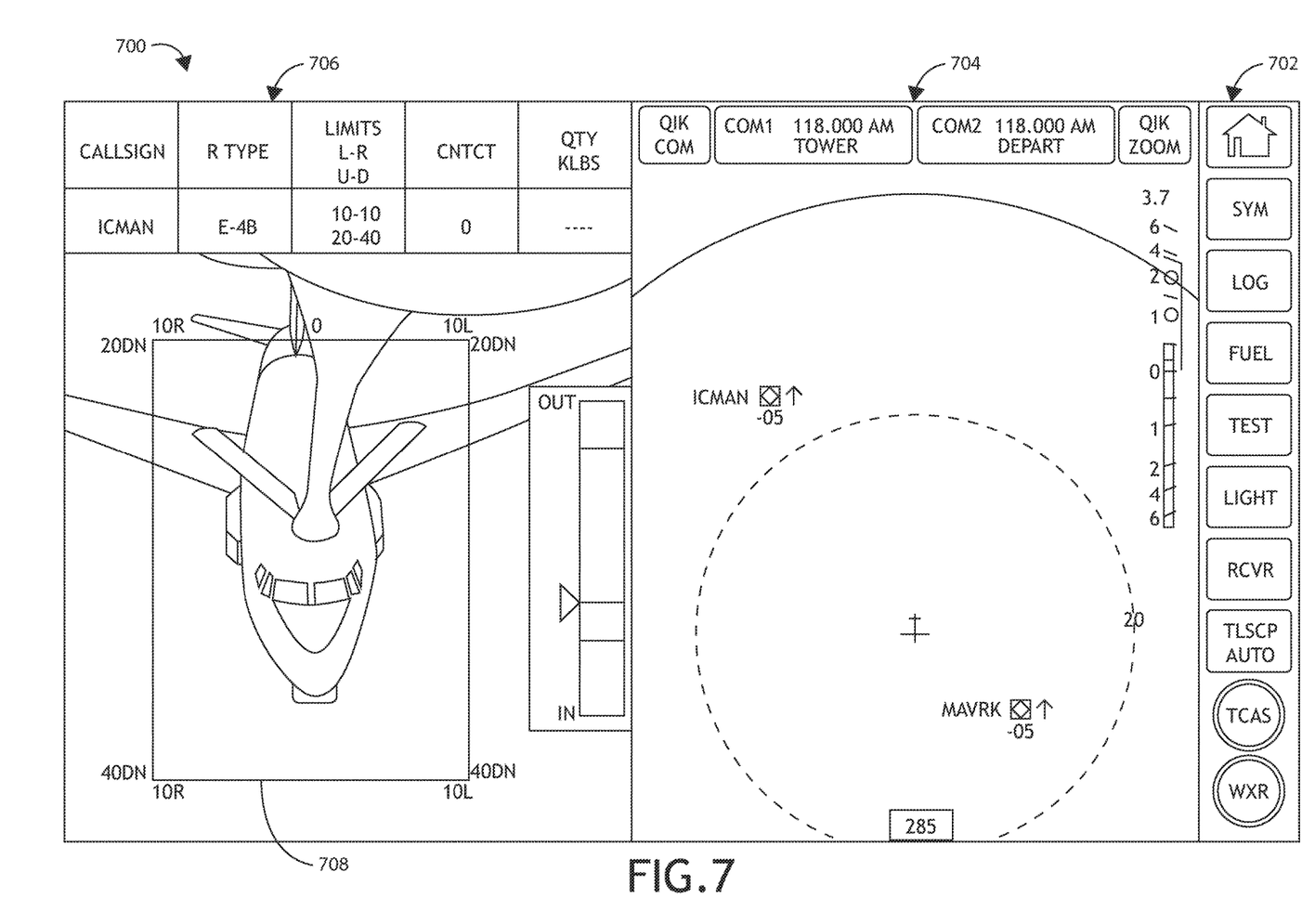
FIG. 7 shows a graphical user interface according to an exemplary embodiment.

Referring to FIG. 7, a graphical user interface according to an exemplary embodiment is shown. The user interface 700 may be divided into a layout display control element 702 and one or more informational display elements 704, 706. At least one of the informational display elements 704, 706 may render a boom arm position graphic derived from one or more image streams from cameras on the refueling aircraft. The graphic may comprise one or more boom arm boundary indicators 708 defined by the maximum movement range of the boom arm as would be visible in the image stream rendered over the streaming image.

In at least one embodiment, features of the refueling aircraft may be identified via reference to a database of aircraft, image processing algorithms such as edge detection, a trained neural network, etc., and called out in the rendered overlay. Upon identifying the refueling aircraft, either automatically or via selection by an operator, appropriate gauge limits may be identified and continuously or periodically monitored with corresponding indications whenever a gauge is outside such limits.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft in-flight refueling system comprising:
   a data storage element;
   a data communication element;
   a boom pod having at least one touch sensitive display; and
   at least one processor in data communication with the data storage element, the data communication element, and the at least one touch sensitive display and a memory storing processor executable code for configuring the at least one processor to:
      determine an operation phase of a refueling operation;
      determine one or more data and control layouts corresponding to the operational phase;
      rendering the one or more data and control layouts on the at least one touch sensitive display during the operational phase;
      receive an input via the touch sensitive display indicating a repositioning of a data and control layout;
      associate the repositioned data and control layout with an operator identify and the operational phase; and
      record a location of the repositioned data and control layout and associated operator identify and operational phase in the data storage element.

2. The aircraft in-flight refueling system of claim 1, further comprising one or more cameras in data communication with the at least one processor, wherein the at least one processor is further configured to:
   receive an image stream from the one or more cameras;
   determine a bounded range of a boom arm within the image stream;
   determine a current location of the boom arm within the image stream; and
   render a boom position layout on the at least one touch sensitive display including the bounded range and the current location.

3. The aircraft in-flight refueling system of claim 2, wherein the at least one processor is further configured to:
   render the image stream; and
   overlay the boom position layout over the image stream.

4. The aircraft in-flight refueling system of claim 3, wherein the at least one processor is further configured to perform an image transformation operation on the image stream to flip the image along an axis.

5. The aircraft in-flight refueling system of claim 1, wherein the at least one processor is further configured to:
record a log of data points corresponding to the data and control layouts to the data storage element; and
periodically transfer the recorded logs to central data store.

6. The aircraft in-flight refueling system of claim 5, wherein the at least one processor is further configured to record a log of data points corresponding to unrendered data and control layouts to the data storage element.

7. The aircraft in-flight refueling system of claim 1, wherein the at least one processor is further configured to:
determine that a data point that is not included in any rendered data and control layout is outside of a predetermined boundary; and
render an indication that a different data and control layout including the data point should be rendered.

8. An in-flight refueling boom pod comprising:
a plurality of displays, at least one being touch sensitive; and
at least one processor in data communication with the plurality of displays and a memory storing processor executable code for configuring the at least one processor to:
determine an operation phase of a refueling operation;
determine one or more data and control layouts corresponding to the operational phase;
rendering the one or more data and control layouts on the plurality of displays during the operational phase;
receive an input via at least one of the plurality of displays indicating a repositioning of a data and control layout;
associate the repositioned data and control layout with an operator identify and the operational phase; and
record a location of the repositioned data and control layout and associated operator identify and operational phase in the data storage element.

9. The in-flight refueling boom pod of claim 8, further comprising one or more cameras in data communication with the at least one processor, wherein the at least one processor is further configured to:
receive an image stream from the one or more cameras;
determine a bounded range of a boom arm within the image stream;
determine a current location of the boom arm within the image stream; and
render a boom position layout on the plurality of displays including the bounded range and the current location.

10. The in-flight refueling boom pod of claim 9, wherein the at least one processor is further configured to:
render the image stream; and
overlay the boom position layout over the image stream.

11. The in-flight refueling boom pod of claim 10, wherein the at least one processor is further configured to perform an image transformation operation on the image stream to flip the image along an axis.

12. The in-flight refueling boom pod of claim 8, further comprising a data storage element and data communication element in data communication with the at least one processor, wherein the at least one processor is further configured to:
record a log of data points corresponding to the data and control layouts to the data storage element; and
periodically transfer the recorded logs to central data store.

13. The in-flight refueling boom pod of claim 12, wherein the at least one processor is further configured to record a log of data points corresponding to unrendered data and control layouts to the data storage element.

14. The in-flight refueling boom pod of claim 8, wherein the at least one processor is further configured to:
determine that a data point that is not included in any rendered data and control layout is outside of a predetermined boundary; and
render an indication that a different data and control layout including the data point should be rendered.

* * * * *